United States Patent [19]
Pugh

[11] Patent Number: 5,988,540
[45] Date of Patent: Nov. 23, 1999

[54] COMMINUTING AND DISTRIBUTING DEVICE FOR RECYCLING YARD WASTE

[76] Inventor: Terrance Pugh, 3535 N. 83$^{rd}$ St., Milwaukee, Wis. 53222

[21] Appl. No.: 09/140,241

[22] Filed: Aug. 26, 1998

[51] Int. Cl.$^6$ ................................. B02C 23/36
[52] U.S. Cl. .................... 241/46.17; 241/50; 241/56; 241/58; 241/97; 241/69; 241/101.74; 241/101.78; 241/282.1
[58] Field of Search .................... 241/101.78, 46.11, 241/46.17, 50, 56, 58, DIG. 38, 186.2, 186.3, 97, 69, 101.74, 282.1, 282.2; 15/340.1, 340.2, 353

[56] References Cited

U.S. PATENT DOCUMENTS

| | | | |
|---|---|---|---|
| 2,033,123 | 3/1936 | Cowles | 241/21 |
| 2,603,462 | 7/1952 | Brown et al. | 366/42 |
| 2,672,075 | 3/1954 | Fraser | 241/43 |
| 2,825,377 | 3/1958 | Ostrowski | 241/69 |
| 3,048,875 | 8/1962 | Bottinelli et al. | 15/301 |
| 3,439,361 | 4/1969 | Moore . | |
| 3,512,713 | 5/1970 | Carlyon, Jr. . | |
| 3,862,467 | 1/1975 | Krickovich | 15/340.4 |
| 3,897,600 | 8/1975 | Burkholder | 4/10 |
| 3,976,252 | 8/1976 | PerDue | 241/46.02 |
| 3,987,970 | 10/1976 | Burkett | 241/43 |
| 4,029,262 | 6/1977 | Lazich et al. | 241/43 |
| 4,272,031 | 6/1981 | Jines | 241/46.17 |
| 4,809,396 | 3/1989 | Houser | 15/320 |
| 4,958,776 | 9/1990 | Walter | 241/171 |
| 5,205,496 | 4/1993 | O'Donnell et al. | 241/34 |
| 5,284,007 | 2/1994 | Poe et al. | 56/320.2 |
| 5,361,771 | 11/1994 | Beryerl | 111/127 |
| 5,447,369 | 9/1995 | Boxall | 366/136 |
| 5,707,017 | 1/1998 | Paolucci et al. | 241/55 |
| 5,839,159 | 11/1998 | Karr et al. | 15/355 |

*Primary Examiner*—Mark Rosenbaum
*Attorney, Agent, or Firm*—Andrus, Sceales, Starke & Sawall

[57] ABSTRACT

A comminuting and distribution device for recycling yard waste is provided. The device includes a mixing tank mounted on an upper surface of a movable support structure. The mixing tank includes a slurry preparation structure therein for creating a slurry from yard waste and fluid deposited within the mixing tank. A distribution structure draws the slurry from a mixing tank and distributes the same to a desired location outside the mixing tank for fertilizing a lawn, garden or the like.

44 Claims, 5 Drawing Sheets

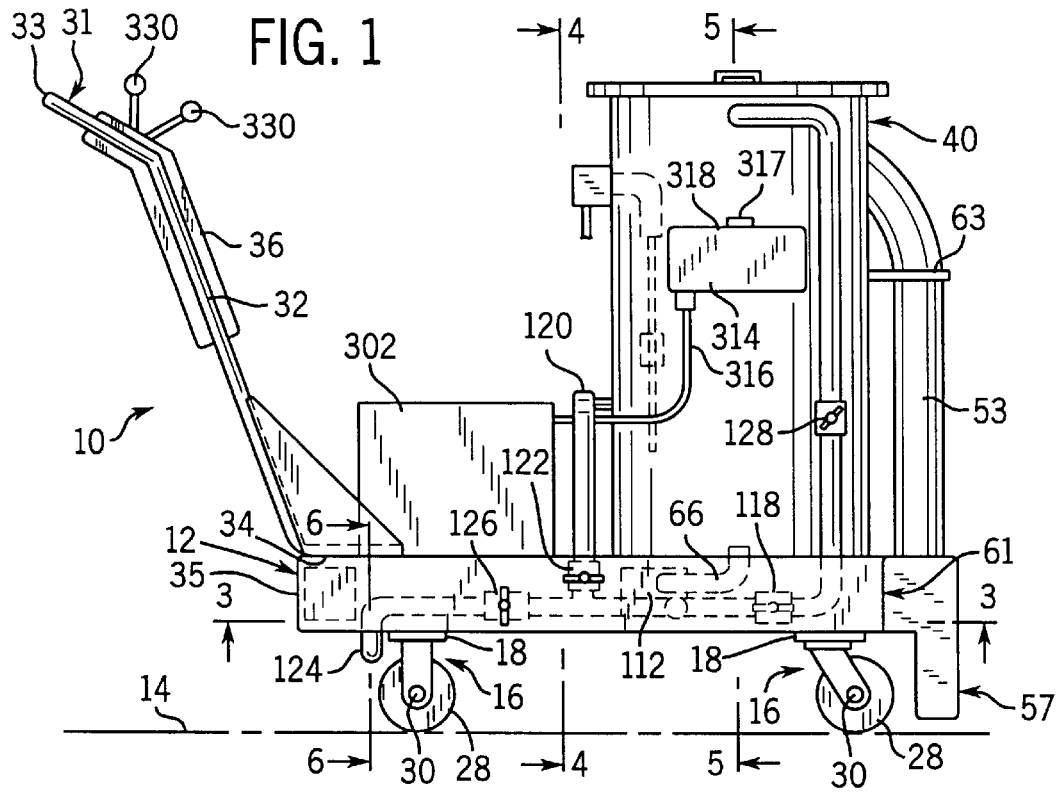
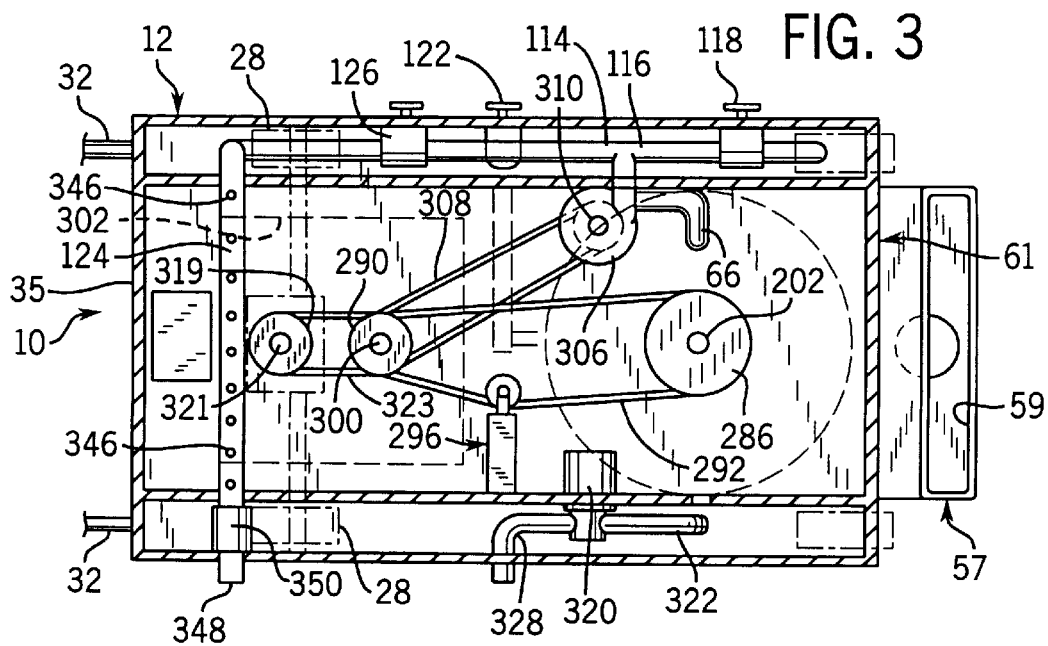

COMMINUTING AND DISTRIBUTING DEVICE FOR RECYCLING YARD WASTE

BACKGROUND AND SUMMARY OF THE PRESENT INVENTION

This invention relates to the recycling of yard waste, and in particular, to an apparatus for the comminution of yard waste and the reintroduction of the comminuted yard waste into a lawn an/or garden in order to provide fertilizer for the same.

Due to environmental concerns, landfill operators have banned the placement of yard waste in their landfills. Consequently, many municipalities now prohibit the depositing of yard waste in refuse containers. As a result, home owners are left to find a new manner to dispose yard waste, such as grass clippings, leaves and the like.

In order to reduce the quantity of yard waste, lawn mower manufacturers have developed lawn mowers which mulch the yard waste into small particles which are reintroduced into the lawn. However, these present day mulching lawn mowers have significant drawbacks. For example, mulching lawn mowers deposit the mulched particles within close proximity to the mower itself. Thereafter, the user of the mulching lawn mower must transport the mulched particles if the user wishes to reintroduce the particles into remote areas which necessitate greater fertilization. This, in turn, is time consuming for the user.

In addition, mulching mowers typically do not mulch the yard waste into small pieces which facilitate the quick biodegradation of the pieces into the soil. As a result, it may take a substantial amount of time before the yard waste degrades and hence, provides nutrition for the lawn or garden. Further, since the pieces of yard waste may remain quite substantial in size, the decomposing yard waste may become odorous and attract rodents and the like.

Finally, when using a mulching lawn mower, the mulched material may congregate at specific spots on the lawn thereby preventing sunlight, and hence growth of the lawn at that locale. This, in turn, may cause damage to the lawn in certain areas.

Therefore, it is a primary object and feature of the present invention to provide an apparatus for the comminution and distribution of yard waste.

It is a further object and feature of the present invention to provide an apparatus for economically fertilizing a lawn and/or garden.

It is a further object and feature of the present invention to provide an apparatus which simply and easily facilitates the disposal of yard waste.

In accordance with the present invention, a comminuting and distribution device for yard waste includes a movable support structure having an upper surface and a downwardly facing surface. A mixing tank is mounted on the upper surface of the support structure. The mixing tank defines an interior for receiving yard waste and fluid therein. A blade assembly is supported within the interior of the mixing tank. The blade assembly includes a blade for comminuting yard waste received within the mixing tank and for mixing the comminuted yard waste with fluid received within the mixing tank so as to form a slurry. A distribution structure draws the slurry from the mixing tank and distributes the same to desired locations outside the mixing tank.

A rotatable shaft extends into the mixing tank. The rotatable shaft is interconnected to the blade of the blade assembly. A drive mechanism rotates the rotatable shaft.

The distribution structure includes a pump for drawing slurry from the interior of the mixing tank and a distribution tube having an inlet interconnected to the pump for receiving the drawn slurry therein. The distribution tube also includes an outlet which is operatively connected to a distribution hose. The distribution hose also includes an outlet for distributing the drawn slurry to a desired location therethrough. A control valve interconnects the outlet of the distribution tube and the inlet of the distribution hose. The control valve controls the flow of slurry into the distribution hose.

A spray nozzle may be interconnected to the outlet of the distribution hose. The spray nozzle includes an actuator movable between a first opened position wherein the drawn slurry flows through the spray nozzle, and a second closed position wherein the spray nozzle prevents the flow of drawn slurry from the outlet of the distribution hose.

The device further includes a recirculation assembly having an inlet operatively connected to the outlet of the distribution tube so as to allow for the flow of slurry therein, and an outlet positioned within the mixing tank for reintroducing a portion of the drawn slurry into the mixing tank. A control valve interconnects the outlet of the distribution tube and the inlet of the recirculation assembly. The control valve controls the flow of drawn slurry into the recirculation assembly.

A distribution element may be operatively connected to the distribution tube. The distribution element distributes a portion of the slurry below the support structure. A distribution element control valve interconnects the distribution tube and the distribution element. The distribution element control valve is movable between a first opened position for allowing the flow of drawn slurry through the distribution element and a second closed position. It is contemplated that the device include a vacuum hose having a movable inlet positioned outside of the mixing tank and an outlet communicating with the interior of the mixing tank. A vacuum producing device is mounted within the mixing tank to generate a suction for drawing yard waste into the inlet of the vacuum hose and through the outlet of the vacuum hose into the interior of the mixing tank.

A fluid structure supplies fluid to the interior of the mixing tank. The fluid structure includes an outlet communicating with the interior of the mixing tank and an inlet operatively connectable to a fluid source. The fluid supply structure includes a pump for drawing fluid from the fluid source and pumping the fluid through the outlet of the fluid supply structure. A control mechanism controls the volume of fluid pumped by the fluid supply structure pump through the fluid supply structure outlet. The control mechanism includes a float for sensing the volume of fluid within the interior of the mixing tank.

It is contemplated to provide a separation element within the mixing tank for separating the yard waste in the mixing tank from the slurry. The separation element may include a mesh screen.

In accordance with another aspect of the present invention, a comminuting and distribution device for yard waste is provided. The device includes a movable support structure having an upper surface and a downwardly facing bottom surface. A mixing tank is mounted on the upper surface of the support structure. The mixing tank defines an interior for receiving yard waste and the fluid therein. A fluid supply structure is provided for supply fluid to the interior of the mixing tank. The fluid supply structure includes an outlet communicating with the interior of the mixing tank and an inlet operatively connectable to a fluid source. A slurry preparation structure is supported within the interior of the mixing tank for creating a slurry from the yard waste and the fluid within the mixing tank. A distribution structure draws the slurry from the mixing tank and distributes the same to a desired location outside the mixing tank.

In yet a still further aspect of the present invention, a comminuting and distribution device includes a movable support structure having an upper surface and a downwardly facing bottom surface. A mixing tank is mounted on the upper surface of the support structure. The mixing tank defines an interior for receiving yard waste and the fluid therein. The vacuum hose is provided and includes a movable inlet positioned outside of the mixing tank and an outlet communicating with the interior of the mixing tank. A vacuum producing device is mounted within the mixing tank. The vacuum generates a suction for drawing yard waste into the inlet of the vacuum hose and through the outlet of the vacuum hose into the interior of the mixing tank. A slurry preparation structure is supported within the interior of the mixing tank for creating a slurry from the yard waste and the fluid within the mixing tank. The distribution structure draws the slurry from the mixing tank and distributes the same to the desired location outside of the mixing tank.

Various other features, objects and advantages of the invention will be made apparent from the following description taken together with the drawings.

BRIEF DESCRIPTION OF THE PREFERRED EMBODIMENT

The drawings furnished herewith illustrate a preferred construction of the present invention in which the above advantages and features are clearly disclosed as well as others which will be readily understood from the following description of the illustrated embodiment.

In the drawings:

FIG. 1 is a side elevational view showing the comminution and distribution apparatus of the present invention;

FIG. 3 is a cross sectional view of the apparatus of FIG. 1 taken along line 3—3;

DETAILED DESCRIPTION OF THE PREFERRED EMBODIMENT

Figure 2:
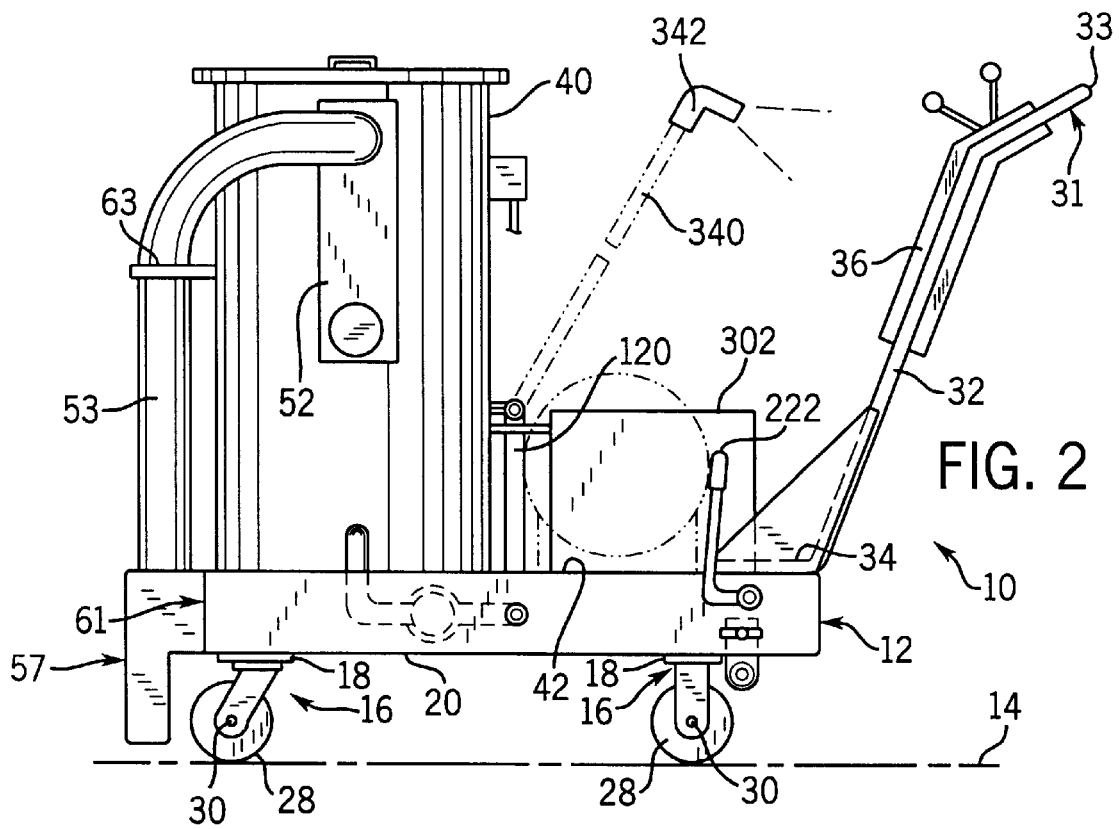
FIG. 2 is a side elevational view showing a second, opposite side, of the apparatus of FIG. 1.
Figure 4:
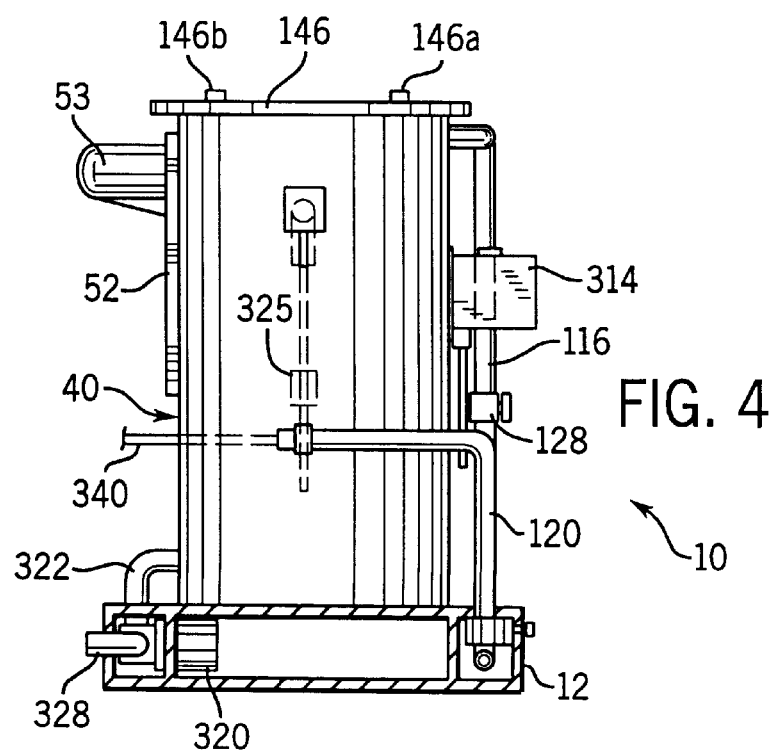
FIG. 4 is a cross sectional view of the apparatus of FIG. 1 taken along line 4—4.

An apparatus for comminuting and distributing yard waste is generally designated by the reference numeral 10. Apparatus 10 includes a platform 12 which is supported above a supporting surface 14, such as a lawn, garden or the like, by a plurality of wheel assemblies 16. Each wheel assembly 16 includes a base 18 mounted to the underside 20 of platform 12. A generally U-shaped fork 22 depends from base 18 and includes first and second spaced wheel support brackets 24 and 26, respectively, for accommodating wheel 28 therebetween. Wheel 28 rotates about and is supported by an axle 30 which extend between brackets 24 and 26.

Apparatus 10 further includes a generally U-shaped handle 31 having first and second legs 32 interconnected by a base 33. Each leg 32 includes an end portion 34 which is mounted to the upper surface 42 of platform 12. Handle 31 extends upwardly and outwardly from the rearward end 35 of platform 12. The first and second legs 32 of handle 31 are also interconnected by a control panel 36 which extends therebetween. Control panel 36 includes various control elements for controlling apparatus 10 as herein described, including a series of user friendly lights which make operation easy and safe. Each light has a dedicated function which permits complete control.

A tank 40 is supported on the upper surface 42 of platform 12. Tank 40 extends along a longitudinal axis and includes a generally cylindrical tank wall 41 and a bottom 43. Tank wall 41 has an inner surface 44 which defines a mixing chamber 46 within tank 40. A vacuum opening 48 extends through tank wall 41 of tank 40 in order to accommodate an end of a vacuum hose, as hereinafter described. A chute 51 is mounted to the inner surface 44 of cylindrical wall 41 over vacuum opening 48 so as to direct the flow of air and/or yard waste downwardly toward the interior of mixing chamber 46.

Figure 5:
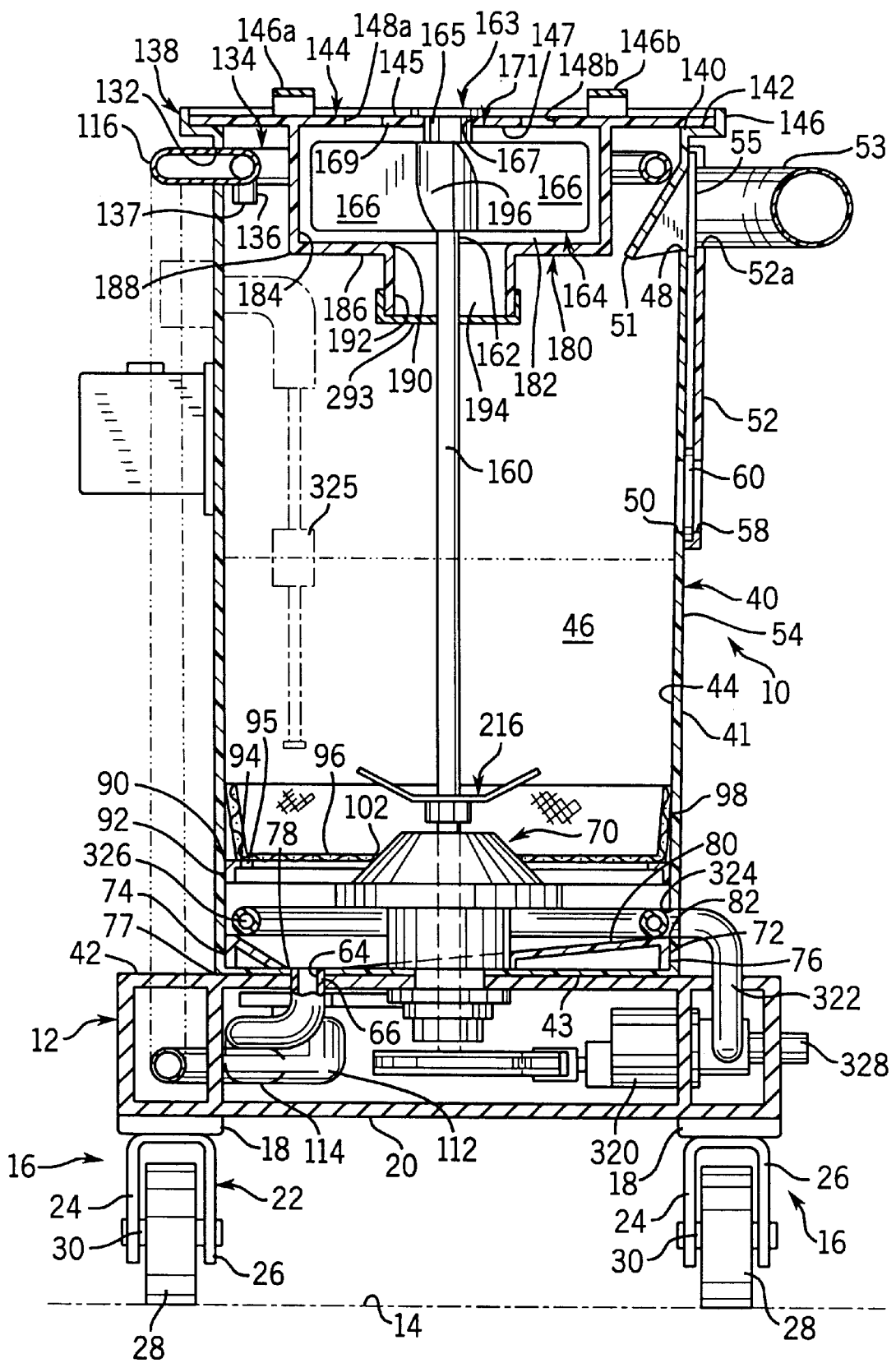
FIG. 5 is a cross sectional view of the apparatus of FIG. 1 taken along line 5—5.
Figure 6:
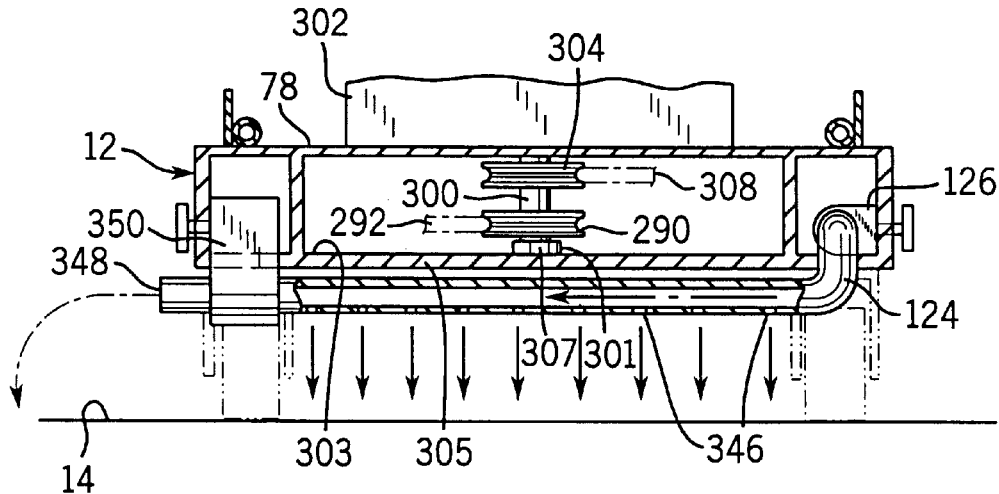
FIG. 6 is a cross sectional view of the apparatus of FIG. 1 taken along line 6—6.

Referring to FIG. 5, tank wall 41 also includes a viewing opening 50. A plate 52 is mounted to the exterior surface 54 of tank wall 41 so as to overlap vacuum opening 48 and viewing opening 50. Plate 52 includes a first upper vacuum opening 52a which overlaps and is in axial alignment with vacuum opening 48 in tank wall 41, and a second opening 58 which overlaps and is in axial alignment with viewing opening 50 in tank wall 41. A transparent window 60 is positioned between tank wall 41 and plate 52 in axial alignment with opening 50 in tank wall 41 and with opening 58 in panel 52 so as to allow a user to view the interior of mixing chamber 46 of tank 40 therethrough.

A flexible hose 53 includes an enlarged head 55 which is captured between the exterior surface 54 of tank wall 41 and the inner surface of plate 52. As best seen in FIGS. 1–2, flexible hose 53 terminates at a nozzle 57 having an inlet 59, FIG. 3, which extends parallel to the forward end 61 of platform 12. Nozzle 57 is releasably mounted to the forward end 61 of platform 12. Similarly, flexible hose 53 is releasably mounted to tank 40 by a connector element 63. As a result, a user may disconnect nozzle 57 from the forward end 61 of platform 12 so as to position inlet 59 in nozzle 57 over a desired location.

Figure 7:
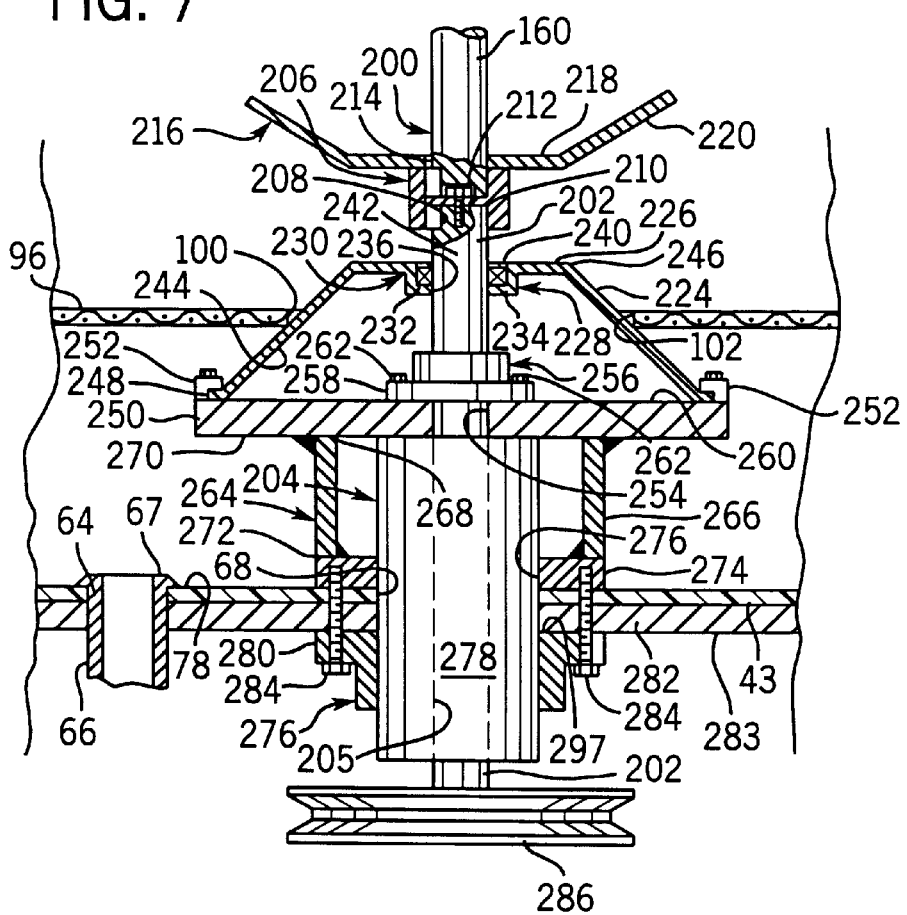
FIG. 7 is an enlarged cross sectional view showing a portion of the apparatus of FIG. 5.

Bottom 43 of tank 40 includes a first drain opening 64 dimensioned to accommodate the mounting of first inlet end 67 of a drainage tube 66 therein, and a second opening 68 dimensioned to accommodate a cutting assembly 70 therethrough. As best seen in FIG. 7, inlet end 67 of drainage tube 66 is enlarged so as to maintain drainage tube 66 within the first drain opening 64 in the bottom 43 of tank 40.

A ramp assembly 72 is positioned along the bottom 43 of tank 40 and includes a radially outer wall 74 having an outer surface 76 engaging the inner surface 44 of tank wall 41 and a lower edge 77 in contact with and supported by inner surface 78 of bottom 43 of tank 40. Ramp assembly 72 also includes a ramp 80 extending radially inward from the upper edge 82 of outer wall 74 of ramp structure 72 toward drain opening 64 in bottom 43.

Tank 40 further includes an L-shaped ledge 90 having a first leg 92 mounted to inner surface 44 of tank wall 41 at a location vertically spaced from bottom 43 of tank 40. A second, screen supporting leg 94 of ledge 90 extends radially inward from inner surface 44 of tank wall 41 toward the interior of mixing chamber 46 of tank 40. Screen support leg 94 of ledge 90 includes an upper surface 95 for supporting mesh screen 96. As best seen in FIG. 5, mesh screen 96 includes a circular, radially outer end 98 which abuts inner surface 44 of tank wall 41, and a radially inner edge 102 which defines an circular opening 100 in mesh screen 96 to accommodate a portion of cutting assembly 70 therethrough.

Figure 8:
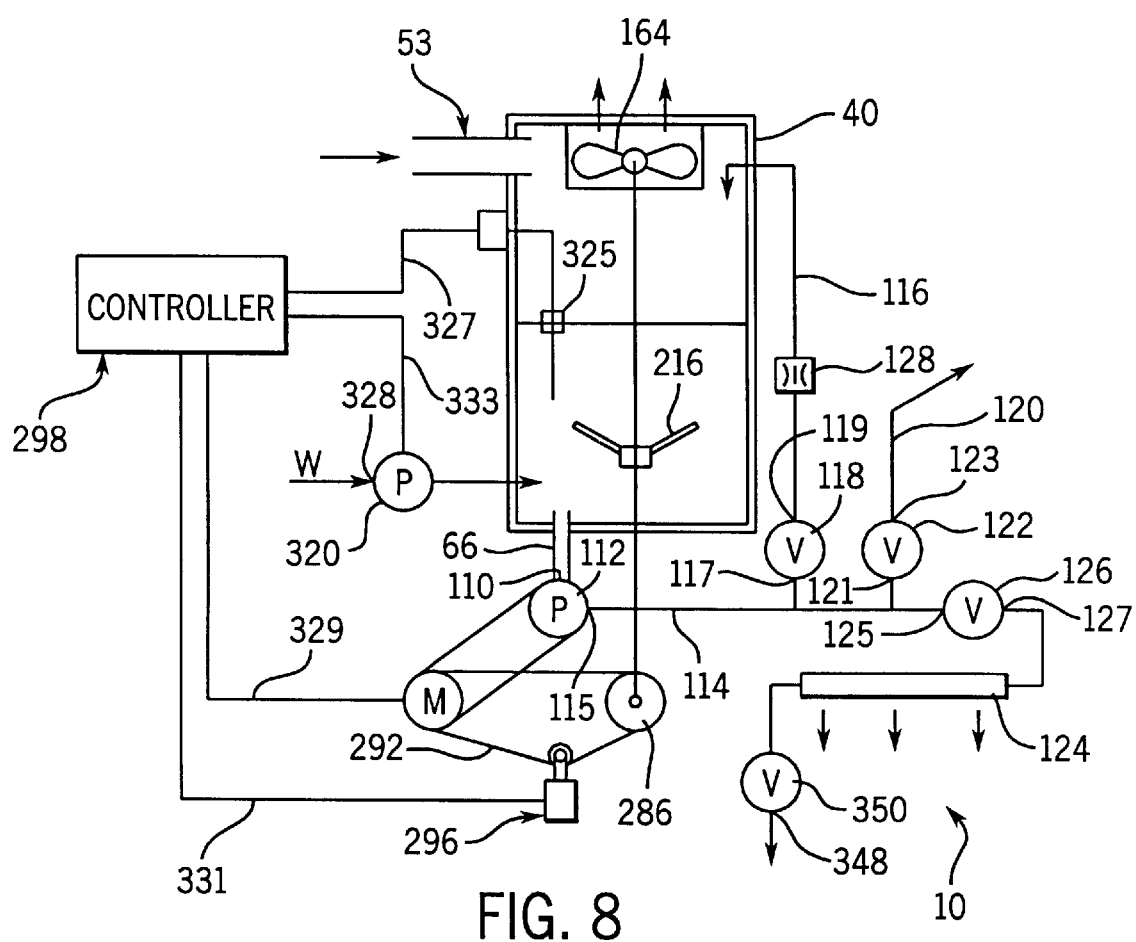
FIG. 8 is a schematic of the comminution and distribution apparatus of the present invention.

As is best seen in FIG. 8, drainage tube 66 includes an outlet end 110 interconnected to a slurry pump 112. A slurry pump tube 114 has an inlet 115 interconnected to the outlet 113 of slurry pump 112 and an outlet 117 operatively connected to an inlet 119 of return tube 116 through return valve 118. As is conventional, return valve 118 is moveable between a first open position allowing the flow of slurry therethrough and a second closed position which prevents the flow of slurry therethrough. Slurry pump tube 114 also includes a second outlet 121 interconnected to inlet 123 of a first distribution tube 120 through a first distribution valve 122. As is conventional, first distribution valve 122 is moveable between a first open position which allows the flow of slurry therethrough, and a second closed position which prevents the flow of slurry therethrough. Slurry pump tube 114 includes a third outlet 125 operatively connected to an inlet 127 of a second distribution tube 124 through a second distribution valve 126. As is conventional, second distribution valve 126 is moveable between a first open position allowing the flow of slurry therethrough, and a second closed position which prevents the flow of slurry therethrough. Return tube 116 includes a shut-off valve 128 which is used to vary the pressure of slurry flow through a hose and spray nozzle to be described hereafter.

Referring to FIG. 5, return tube 116 extends through an opening 132 in tank wall 41 of tank 40. Return tube 116 is in communication within and is connected to a tubular recirculation ring 134 within tank 40. Recirculation ring 134 is supported with the upper portion of tank 40 and includes a plurality of spouts 136 depending therefrom having outlets 137 directed toward the interior of mixing chamber 46.

Tank 40 further includes a lid supporting lip 138 which extends radially about the upper edge 140 of tank wall 41. Lid supporting lip 138 includes a generally horizontal leg 142 to support lid 144 thereon, and a sidewall 146 projecting vertically therefrom to prevent lateral movement of lid 144. Lid 144 includes an upper surface 145 having first and second handles 146a and 146b, respectively, projecting therefrom to facilitate the removal of lid 144 from tank 40. Lid 144 further includes first and second exhaust openings 148a and 148b, respectively, therein, for reasons hereinafter described.

Lid 144 further includes a fan shroud 180 which depends from downwardly facing surface 147 of lid 144 and defines a fan receipt cavity 182 therein. Fan shroud 180 includes a generally cylindrical vertical wall 184 which depends from downwardly facing surface 147 of lid 144, and horizontal wall 186 which extends radially inward from the lower edge 188 of vertical wall 184. Horizontal wall 186 terminates at radially inner end 190. A second generally cylindrical vertical wall 192 depends from inner end 190 of horizontal wall 186 and defines a shaft passageway 194. Shaft passageway 194 communicates with the interior of mixing chamber 46 of tank 40 and with the fan receipt cavity 182 within fan shroud 180.

Cutting assembly 70 includes an elongated generally cylindrical shaft 160 extending along the longitudinal axis of tank 40. As best seen in FIG. 5, shaft 160 includes an upper end 162 rotatably received within an end cap 163. End cap 163 includes a generally cylindrical body portion 165 which is received within a corresponding opening 167 in lid 144. End cap 163 includes an enlarged head 169 which is integral with body portion 165 and includes a lower surface 171 which engages and is supported by upper surface 145 of the lid 144.

A fan 164 is mounted to the upper end 162 of shaft 160. Fan 164 includes a generally cylindrical hub 196 having a plurality of blades 166 extending radially. Rotation of shaft 160, and hence, fan 164, generates a vacuum drawing air through opening 59 in nozzle 57, through flexible hose 53, and into interior mixing chamber 46 of tank 40. The air drawn into tank 40 is exhausted through exhaust openings 148a and 148b in lid 144.

Shaft 160 extends downwardly from end cap 163 through shaft passageway 164 and fan shroud 180. Referring to FIG. 7, shaft 160 includes a lower end 200 rotatably connected to a drive shaft 202 by a connector assembly 206. Connector assembly 206 includes a first keyed recess 208 which receives end 210 of drive shaft 202 and forms a mating relationship therewith. A bolt 212 interconnects connector assembly 206 with drive shaft 202. Connector assembly 206 further includes a second keyed recess 214 which is adapted for receiving end 200 of shaft 160 in a mating relationship. In its assembled position, rotation of drive shaft 202 causes rotation of shaft 160 about a common axis.

End 200 of shaft 160 further includes a plurality of blades 216 extending radially therefrom. Each blade 216 includes a generally horizontal portion 218 extending from shaft 116 and an angled portion 220 extending from the horizontal portion 218 of each blade 216. In the depicted embodiment, FIG. 7 shows angled portion 220 of each blade 216 extending upwardly from horizontal portion 218. It is contemplated that one or more of blades 216 have an angled portion 220 which extends upwardly from horizontal portion 218 in order to insure proper grinding of the yard waste received within the interior mixing chamber 46 of tank 40. It is also contemplated that platform 12 is provided with a suitable linkage which permits blades 216 to be released upon pivoting of a release handle 222 (FIG. 2).

Cutting assembly 70 further includes a shroud 224 which is adapted for receipt within opening 100 in mesh screen 96. Shroud 224 includes a generally horizontal upper wall 226 having a generally circular configuration. Upper wall 226 includes a seal receiving recess 228 at its radially inner edge 230. Seal receiving recess 228 includes a generally vertical leg 232 which depends from inner edge 230 of upper wall 226 of shroud 224, and a horizontal leg 234 which extends inwardly from a vertical leg 234 of seal receiving recess 228. Horizontal leg 232 terminate at a radially inner edge 236 which defines a generally circular opening in horizontal leg 234 in order to accommodate drive shaft 202 extending therethrough. A seal 240 may be positioned within seal receipt cavity 228 so as to engage the outer surface 242 of drive shaft 202 and to prevent the flow of fluid therepast.

Shroud 234 further includes a generally conical portion 244 which extends from the outer edge 246 of upper wall 226. Conical portion 244 of shroud 224 terminates at a lower edge 248 which is interconnected to a support 250 by a plurality of connection elements 252.

Support 250 includes an opening 254 therethrough to accommodate drive shaft 202 extending therethrough. A collar 256 is positioned about drive shaft 202 and includes an enlarged base 258 which is mounted to the upper surface 260 of support 250 by a plurality of bolts 262. Collar 256 rotatably supports drive shaft 202 and prevents lateral movement of the same.

Support 250 is supported above the inner surface 78 of bottom 43 of tank 40 by a support structure 264. Support structure 264 includes a generally cylindrical vertical wall 266 having an upper edge 268 welded to the underside 270 of support 250. A lower edge 272 is welded to a horizontal disc 274. Horizontal disc 274 includes an opening 275 therein to accommodate a cylindrical bush 204. Cylindrical bush 204 includes a passageway 205 therethrough to rotatably support drive shaft 202.

A collar 276 is positioned about the outer surface 278 of bush 204 so as to support bush 204 and prevent laterally movement of the same. Collar 276 includes an enlarged base 280 which is interconnected to upper wall 282 of platform 12, bottom 43 of tank 40 and horizontal disc 274 of support structure 264 by a plurality of bolts 284. Collar 276 is positioned about drive shaft 208 such that the upper surface 277 of enlarged base 280 abuts the bottom surface 283 of the upper wall 282 of platform 12.

Drive shaft 202 extends through bush 204 and is interconnected to a flywheel 286. As best seen in FIG. 3, flywheel 286 for drive shaft 202 is operatively connected to drive wheel 290 by an endless belt 292. The tension on endless belt 292 between flywheel 286 for drive shaft 202 and drive wheel 290 is controlled by a tension adjustment mechanism 296. As best seen in FIG. 8, tension adjustment apparatus 296 is operatively connected to controller 298 on control panel 36 such that a user may vary the tension on endless belt 292 in order to prevent slippage of such belt 292 about drive wheel 290 and flywheel 286.

Drive wheel 290 is mounted on a drive shaft 300 which is rotatably driven by an engine 302 mounted on the upper surface 78 of platform 12. In the preferred embodiment, engine 302 is a conventional gasoline engine. A bearing 301 is mounted to the upper surface 303 of lower wall 305 of platform 12. Bearing 301 rotatably supports end 307 of drive shaft 300.

A second drive wheel 304 is mounted on drive shaft 300. Drive wheel 304 is operatively connected to flywheel 306 by an endless belt 308. Fly wheel 306 is mounted on shaft 310 of slurry pump 112 such that rotation of shaft 310 by flywheel 306 actuates slurry pump 112.

A fuel tank 314 is mounted on the outer surface 54 of tank 40 and is interconnected to engine 302 by fuel line 316. Fuel tank 314 includes an opening 318 therein for replenishing the fuel tank 314 with fuel. A cap 317 may cover the opening 318 to prevent fuel from spilling or evaporating out of fuel tank 314, and for preventing contaminants from entering fuel tank 314.

It is also contemplated as being within the scope of the present invention to drive wheels 28 of each wheel assembly 16 with engine 302 in order that apparatus 10 be self-propelled. In order to accomplish this, a pulley 319 is mounted on a driving shaft 321 in operative engagement with the front wheels 28. A fan belt 323 entrains pulley 319 and drive wheel 290 so that when drive shaft 300 rotates, power is transmitted to the wheels 28.

In operation, engine 302 is started in a conventional manner. A user actuates rotation of drive shaft 300 with one of the control levers 330 on control panel 36, line 329. Drive wheel 290 rotates with drive shaft 300 which, in turn, rotates fly wheel 286 by means of endless belt 292. Belt tensioning device 296 may be adjusted by one of the control levers 330 on control panel 36 in order to control the rotational speed of flywheel 286 and to prevent slippage of belt 292 about drive wheel 290 and flywheel 286, line 331.

By rotating flywheel 286, drive shaft 202 and hence, shaft 160 interconnected thereto, rotates about the longitudinal axis. Blades 216 rotate with shaft 160, as well as blades 166 which rotate with shaft 160. As previously described, rotation of blades 166 generates a vacuum within the interior of mixing chamber 46 of tank 40 by drawing air through nozzle 57 and flexible hose 53 into opening 48 in tank wall 41. In this manner, yard waste may be sucked by the force of the vacuum into the interior mixing chamber 46 of tank 40. Mesh screen 96 prevents large particles of the leaves and yard waste from passing therethrough. In addition, a mesh screen 293 is positioned over the opening between mixing chamber 46 and shaft passageway 194 in order to prevent yard waste from being drawn into the fan receipt cavity 182. The air drawn in nozzle 57 flows through the interior mixing chamber 46 of tank 40 and exits through exhaust passages 148A and 148B in lid 144, as heretofore described.

A water source, depicted by arrow W, FIG. 8, is interconnected to the inlet 328 of an inlet pump 320. Inlet pump 320 has an output connected to a water introduction tube 322 which extends into the interior of mixing chamber 46 of tank 40 through an opening 324 in tank wall 41. Water introduction tube 322 includes a plurality of outlets 326 which fill the interior mixing chamber 46 of tank 40 with water pumped into water introduction tube 322 from the water source W by inlet pump 320.

A float 325 is operatively connected by line 327 to controller 298 which monitors the a volume of water within the interior of mixing chamber 46 of tank 40 so as to prevent the overflow of water from tank 40. If the water level within the interior of mixing chamber 46 of tank 40 exceeds a predetermined level, controller 298 sends a signal via line 333 to the inlet pump 320 in order to shut off inlet pump 320 and the flow of water into the interior mixing chamber 46 of tank 40.

The yard waste is comminuted by blades 216 and mixed with the water within the interior mixing chamber 46 of tank 40 to form a slurry. The slurry passes through mesh screen 96 and into inlet end 67 of drainage tube 66. The slurry flows through drainage tube 66 into slurry pump 112 which pumps the slurry into slurry pump tube 114. With return valve 118 in the open position, a portion of the slurry in slurry pump tube 114 enters return tube 116 and flows into tubular recirculation ring 134. The portion of the slurry then flows out of the outlets 137 of spouts 136 into the interior mixing chamber 46 of tank 40.

With first distribution valve 122 open, a portion of the slurry in slurry pump tube 114 flows into first distribution tube 120. As best seen in FIG. 2, first distribution tube 120 may be comprised of a hose 340 having a spray nozzle 342 on the end thereof. A user may actuate the spray nozzle in a conventional manner so as to spray the slurry in a user selected area such as a lawn, garden or the like in order to fertilize the same with the slurry.

With second distribution valve 126 in the open position, a portion of the slurry in slurry pump tube 114 flows into second distribution tube 124 which is supported above the supporting surface 14 by platform 12. Second distribution tube 124 includes a plurality of apertures 346 which allow for the flow of slurry therethrough onto the supporting surface 14. Second distribution tube 124 also includes an opening 348 which allows for the flow of slurry in distribution tube 124 at its terminal therethrough. A valve 350 may be used to open and close access to opening 348 in distribution tube 124.

By pushing or pulling on handle 31, apparatus 10 may be rolled on wheels 28 to a desired position on supporting surface 14. A user may position apparatus 10 at predetermined locations about a yard or garden to allow nozzle 57 to receive the maximum amount of yard waste.

Various modes of carrying out the invention are contemplated as being within the scope of the following claims particularly pointing out and distinctly claiming the subject matter which is regarded as the invention

I claim:

1. A self-propelled, yard waste comminuting and distribution device, comprising:

a movable support structure having an upper surface and a downwardly facing bottom surface carrying a plurality of wheels;

a mixing tank mounted on the upper surface of the support structure, the mixing tank defining an interior for receiving yard waste and a fluid therein;

a blade assembly supported within the interior of the mixing tank, the blade assembly including a blade for comminuting yard waste received within the mixing tank and for mixing the comminuted yard waste with fluid received within the mixing tank so as to form a slurry;

a distribution structure for drawing the slurry from the mixing tank and for distributing the same to a desired location outside or inside the mixing tank, and a single drive mechanism mounted on the support structure outside the mixing tank, and operably connected to the wheels for propelling the device, to the blade assembly for rotating the blade within the mixing tank and to the distribution structure for drawing the slurry from the mixing tank and distributing same to the desired location outside or inside the mixing tank.

2. The device of claim 1 further comprising a rotatable shaft extending into the mixing tank, the rotatable shaft interconnected to the blade of the blade assembly.

3. The device of claim 1 wherein the drive mechanism includes a motor.

4. The device of claim 1 wherein the distribution structure includes a pump for drawing slurry from the interior of the mixing tank, and a distribution tube having an inlet interconnect to the pump for receiving the drawn slurry therein and an outlet.

5. The device of claim 4, wherein the distribution structure includes a distribution hose, the distribution hose having an inlet operatively connected to the outlet of the distribution tube for receiving the drawn slurry therein, and an outlet for distributing the drawn slurry to the desired location therethrough.

6. The device of claim 5 wherein the distribution structure includes a control valve interconnecting the outlet of the distribution tube and the inlet of the distribution hose, the control valve controlling the flow of slurry into the distribution hose.

7. The device of claim 6 further comprising a spray nozzle interconnected to the outlet of the distribution hose, the spray nozzle including an actuator movable between a first open position wherein drawn slurry flows through the spray nozzle, and a second closed position wherein the spray nozzle prevents the flow of drawn slurry from the outlet of the distribution hose.

8. The device of claim 4 further comprising a recirculation assembly, the recirculation assembly including an inlet operatively connected to the outlet of the distribution tube so as to allow for the flow of slurry therein, and an outlet positioned within the mixing tank for reintroducing a portion of the drawn slurry into the mixing tank.

9. The device of claim 8 further comprising a control valve interconnecting the outlet of the distribution tube and the inlet of the recirculation assembly, the control valve controlling the flow of drawn slurry into the recirculation assembly.

10. The device of claim 4 further comprising a distribution element operatively connected to the distribution tube, the distribution element distributing a portion of the drawn slurry below the support structure.

11. The device of claim 10 further comprising a distribution element control valve interconnecting the distribution tube and the distribution element, the distribution element control valve movable between a first open position for allowing the flow of drawn slurry through the distribution element and a second closed position.

12. The device of claim 10 wherein the distribution element includes an aperture for allowing the continuous flow of drawn slurry therethrough when the distribution element control valve is in the open position.

13. The device of claim 1 further comprising a vacuum hose having a movable inlet positioned outside of the mixing tank and outlet communicating with the interior of the mixing tank, and a vacuum producing device mounted within the mixing tank, the vacuum producing device generating a suction for drawing yard waste into the inlet of the vacuum hose and through the outlet of vacuum hose into the interior of the mixing tank.

14. The device of claim 1 further comprising a fluid supply structure for supplying fluid to the interior of the mixing tank, the fluid supply structure including an outlet communicating with the interior of the mixing tank and an inlet operatively connectable to a fluid source.

15. The device of claim 14 wherein the fluid supply structure includes a pump for drawing fluid from the fluid source and pumping the fluid through the outlet of the fluid supply structure.

16. The device of claim 15 wherein the fluid supply structure includes a control mechanism for controlling the volume of fluid pumped by the fluid supply structure pump through the fluid supply structure outlet.

17. The device of claim 16 wherein the control mechanism of the fluid supply structure includes a float for sensing the volume of fluid within the interior of the mixing tank.

18. The device of claim 1 further comprising a separation element within the mixing tank for separating the yard waste in the mixing tank from the slurry.

19. The device of claim 18 wherein the separation element includes a mesh screen.

20. A self-propelled, yard waste comminuting and distribution device comprising:

a movable support structure having an upper surface, a downwardly facing bottom surface carrying a plurality of wheels and a handle extending upwardly from the support structure;

a mixing tank mounted on the upper surface of the support structure, the mixing tank defining an interior for receiving yard waste and a fluid therein;

a fluid supply structure for supplying fluid to the interior of the mixing tank, the fluid supply structure including an outlet communicating with the interior of the mixing tank and an inlet operatively connectable to a fluid source;

a slurry preparation structure supported within the interior of the mixing tank for creating a slurry from yard waste and the fluid within the mixing tank;

a distribution structure for drawing slurry from the mixing tank and for distributing the same to a desired location outside or inside the mixing tank;

a single drive mechanism mounted on the support structure outside the mixing tank and operably connected to the wheels for propelling the device, to the slurry preparation structure for creating a slurry; and to the distribution structure for drawing slurry from the mixing tank and distributing the same to the desired location outside or inside the mixing tank; and a controller mounted on the handle for centrally controlling the drive mechanism, the fluid supply structure, the slurry preparation structure and the distribution structure.

21. The device of claim 20 wherein the slurry preparation structure includes a rotatable shaft extending into the mixing tank, and a blade mounted thereto.

22. The device of claim 20 wherein the drive mechanism includes a motor.

23. The device of claim 20 wherein the distribution structure includes a pump for drawing slurry from the interior of the mixing tank and a distribution tube having an inlet interconnect to the pump for receiving the drawn slurry therein, and an outlet.

24. The device of claim 23 wherein the distribution structure includes a distribution hose, the distribution hose having an inlet operatively connected to the outlet of the distribution tube for receiving the drawn slurry therein, and an outlet for distributing the drawn slurry to the desired location therethrough.

25. The device of claim 24 wherein the distribution structure includes a control valve interconnecting the first outlet of the distribution tube and the inlet of the distribution hose, the control valve controlling the flow of drawn slurry into the distribution hose.

26. The device of claim 25 further comprising a spray nozzle interconnected to the outlet of the distribution hose, the spray nozzle including an actuator movable between a first open position wherein drawn slurry flows through the spray nozzle, and a second closed position wherein the spray nozzle prevents the flow of drawn slurry from the outlet of the distribution hose.

27. The device of claim 23 further comprising a recirculation assembly, the recirculation assembly including an inlet operatively connected to the outlet of the distribution tube so as to allow for the flow of slurry therein, and an outlet positioned within the mixing tank for reintroducing a portion of the drawn slurry into the mixing tank.

28. The device of claim 27 wherein the recirculation assembly includes a control valve interconnecting the outlet of the distribution tube and the inlet of the recirculation assembly, the control valve controlling the flow of drawn slurry into the recirculation assembly.

29. The device of claim 23 further comprising a distribution element operatively connected to the distribution tube, the distribution element distributing a portion of the drawn slurry below the support structure.

30. The device of claim 29 further comprising a distribution element control valve interconnecting the distribution tube and the distribution element, the distribution element control valve movable between a first open position for allowing the flow of drawn slurry through the distribution element and a second closed position.

31. The device of claim 29 wherein the distribution element includes an aperture for allowing the continuous flow of drawn slurry therethrough when the distribution element control valve is in the open position.

32. A self-propelled, yard waste comminuting and distribution device, comprising:

a movable support structure having an upper surface and a downwardly facing bottom surface carrying a plurality of wheels;

a mixing tank mounted on the upper surface of the support structure, the mixing tank defining an interior for receiving yard waste and a fluid therein;

a vacuum hose having a movable inlet positioned outside of the mixing tank for releasable securement to the support structure, and an outlet communicating with the interior of the mixing tank;

a vacuum producing device mounted within the mixing tank, the vacuum producing device generating a suction for drawing yard waste into the inlet of the vacuum hose and through the inlet of vacuum hose into the interior of the mixing tank;

a slurry preparation structure supported within the interior of the mixing tank for creating a slurry from the yard waste and the fluid within the mixing tank;

a distribution structure for drawing the slurry from the mixing tank and for distributing the same to a desired location outside or inside the mixing tank;

a single drive mechanism mounted on the support structure outside the mixing tank and operably connected to the wheels for propelling the device, the vacuum producing device for generating the suction for drawing yard waste into the mixing tank, the slurry preparation structure for creating a slurry, and to the distribution structure for drawing slurry from the tank and distributing same to a desired location outside or inside the mixing tank; and a driven wheel and belt arrangement located on the support structure for transferring power from the drive mechanism to the wheels, vacuum producing device, slurry preparation structure and distribution structure.

33. The device of claim 32 wherein the slurry preparation structure includes a rotatable shaft extending into the mixing tank, and a blade mounted thereto.

34. The device of claim 33 further comprising a drive mechanism for rotating the rotatable shaft.

35. The device of claim 32 wherein the drive mechanism includes a motor.

36. The device of claim 32 wherein the distribution structure includes a pump for drawing the slurry from the interior of the mixing tank and a distribution tube having an inlet interconnect to the pump for receiving the drawn slurry therein, and an outlet.

37. The device of claim 36 wherein the distribution structure includes a distribution hose, the distribution hose having an inlet operatively connected to the outlet of the distribution tube for receiving the drawn slurry therein, and an outlet for distributing the drawn slurry to the desired location therethrough.

38. The device of claim 37 wherein the distribution structure includes a control valve interconnecting the first outlet of the distribution tube and the inlet of the distribution hose, the control valve controlling the flow of slurry into the distribution hose.

39. The device of claim 38 further comprising a spray nozzle interconnected to the outlet of the distribution hose, the spray nozzle including an actuator movable between a first open position wherein drawn slurry flows through the spray nozzle, and a second closed position wherein the spray nozzle prevents the flow of drawn slurry from the outlet of the distribution hose.

40. The device of claim 36 further comprising a recirculation assembly, the recirculation assembly including an inlet operatively connected to the outlet of the distribution tube so as to allow for the flow of slurry therein, and an outlet positioned within the mixing tank for reintroducing a portion of the drawn slurry into the mixing tank.

41. The device of claim 40 wherein the recirculation assembly includes a control valve interconnecting the outlet of the distribution tube and the inlet of the recirculation assembly, the control valve controlling the flow of drawn slurry in the recirculation assembly.

42. The device of claim 36 further comprising a distribution element operatively connected to the distribution tube, the distribution element distributing a portion of the drawn slurry below the support structure.

43. The device of claim 29 further comprising a distribution element control valve interconnecting the distribution tube and the distribution element, the distribution element control valve movable between a first open position for allowing the flow of drawn slurry through the distribution element and a second closed position.

44. The device of claim 43 wherein the distribution element includes an aperture for allowing the continuous flow of drawn slurry therethrough when the distribution element control valve is in the open position.

* * * * *